(12) United States Patent
Onstott et al.

(10) Patent No.: US 11,803,577 B1
(45) Date of Patent: Oct. 31, 2023

(54) PARENT/CHILD DOCUMENT INDEXING

(71) Applicant: Amazon Technologies, Inc., Seattle, WA (US)

(72) Inventors: Carr James Onstott, Seattle, WA (US); Edwin Robbins, Redmond, WA (US); John Richter, Seattle, WA (US); Rong Xiao, Vancouver (CA); Thomas Barton, Mukilteo, WA (US)

(73) Assignee: Amazon Technologies, Inc., Seattle, WA (US)

( * ) Notice: Subject to any disclaimer, the term of this patent is extended or adjusted under 35 U.S.C. 154(b) by 14 days.

(21) Appl. No.: 17/402,437

(22) Filed: Aug. 13, 2021

(51) Int. Cl.
    *G06F 7/00* (2006.01)
    *G06F 16/31* (2019.01)
    *G06F 16/21* (2019.01)
    *G06F 16/33* (2019.01)

(52) U.S. Cl.
    CPC .......... *G06F 16/328* (2019.01); *G06F 16/219* (2019.01); *G06F 16/3331* (2019.01)

(58) Field of Classification Search
    CPC ... G06F 16/328; G06F 16/219; G06F 16/3331
    See application file for complete search history.

(56) References Cited

U.S. PATENT DOCUMENTS

| | | | | |
|---|---|---|---|---|
| 5,761,655 A * | 6/1998 | Hoffman | ................. | G06F 16/58 |
| 6,055,526 A * | 4/2000 | Ambroziak | ........... | G06F 16/328 |
| | | | | 707/999.102 |
| 6,427,123 B1 * | 7/2002 | Sedlar | ................... | G06F 16/284 |
| | | | | 702/2 |
| 7,110,992 B2 * | 9/2006 | Wilson | .................. | G06F 16/382 |
| 9,208,254 B2 * | 12/2015 | Zhang | .................. | G06F 40/143 |
| 9,483,568 B1 * | 11/2016 | Fontoura | ............... | G06F 16/951 |
| 9,501,506 B1 * | 11/2016 | Fontoura | ............... | G06F 16/328 |
| 10,623,520 B1 * | 4/2020 | Anderson, III | ..... | G06F 16/2264 |
| 10,769,230 B1 * | 9/2020 | Rousselle | ........... | G06F 16/9566 |
| 11,449,511 B1 * | 9/2022 | Townsend | ............ | G06F 16/904 |
| 11,468,031 B1 * | 10/2022 | Hazel | .................. | G06F 16/2453 |
| 11,475,600 B2 * | 10/2022 | Pellegrin | .............. | H04N 19/159 |
| 2001/0007987 A1 * | 7/2001 | Igata | ....................... | G06F 16/93 |
| 2002/0087597 A1 * | 7/2002 | Wilson | .................. | G06F 16/382 |
| | | | | 715/260 |
| 2002/0095397 A1 * | 7/2002 | Koskas | ............... | G06F 16/2237 |
| 2002/0143742 A1 * | 10/2002 | Nonomura | ............. | G06F 16/83 |
| | | | | 707/E17.127 |
| 2004/0068498 A1 * | 4/2004 | Patchet | ................... | G06F 16/81 |

(Continued)

*Primary Examiner* — Mohammed R Uddin
(74) *Attorney, Agent, or Firm* — Davis Wright Tremaine LLP

(57) ABSTRACT

Systems and methods are described for indexing related documents to provide more robust search functionality within an index. In one aspect, a first document, such as a comment or status update associated with a second document or ticket item, may be obtained. As a result of the first document including first data that is linked to second data of the second document, an instance of the second document may be modified to include at least a portion of the first data. An index, which indexes a corpus of documents, such as ticket items, may be updated to include the modified second document, such that the first data is associated with the modified second document in the index. Responsive to a query for the first data in the index, the modified second document and any included first data may be returned.

20 Claims, 9 Drawing Sheets

(56) References Cited

U.S. PATENT DOCUMENTS

| | | | |
|---|---|---|---|
| 2005/0091287 A1* | 4/2005 | Sedlar | G06F 16/188 |
| 2006/0053157 A1* | 3/2006 | Pitts | G06F 16/148 |
| | | | 707/999.102 |
| 2008/0005145 A1* | 1/2008 | Worrall | G06F 16/188 |
| 2008/0028293 A1* | 1/2008 | Seliutin | G06F 16/93 |
| | | | 707/999.001 |
| 2008/0235210 A1* | 9/2008 | Krishnaprasad | G06F 16/93 |
| | | | 707/999.005 |
| 2011/0179085 A1* | 7/2011 | Hammerschmidt | G06F 16/81 |
| | | | 707/E17.012 |
| 2013/0166547 A1* | 6/2013 | Pasumarthi | G06Q 10/06 |
| | | | 707/E17.014 |
| 2014/0280284 A1* | 9/2014 | Emanuel | G06F 16/951 |
| | | | 707/766 |
| 2015/0227590 A1* | 8/2015 | Nissen | G06F 16/94 |
| | | | 707/728 |
| 2016/0321376 A1* | 11/2016 | Taylor | G06F 16/2272 |
| 2017/0011092 A1* | 1/2017 | Huddleston | G06F 16/2455 |
| 2018/0246972 A1* | 8/2018 | Shukla | G06F 16/9535 |
| 2021/0406241 A1* | 12/2021 | Patel | G06F 16/128 |

* cited by examiner

PARENT/CHILD DOCUMENT INDEXING

BACKGROUND

Many data storage solutions, including non-relational or non-structured query language (NoSQL) databases typically do not support joins, such that documents of different types cannot be indexed together. ElasticSearch (ES) is a widely adopted search engine that can be used to enhance search functionality in non-relational databases. Each 'row' in ES is represented as a single document. Different types of documents are stored in separate indexes which cannot be queried together. An example of different document types includes a first document, such as a ticket, work order, etc., and one or more second documents, such as comments that relate to the tickets or work order. If the ticket data is stored in one index as one set of documents, and then the comments are stored in a separate index each as their own separate document, ES does not support a single query that can find all tickets where a text phrase is mentioned either in the ticket body or in any of the comments on the ticket.

BRIEF DESCRIPTION OF THE DRAWINGS

Various techniques will be described with reference to the drawings, in which.

DETAILED DESCRIPTION

Figure 1:
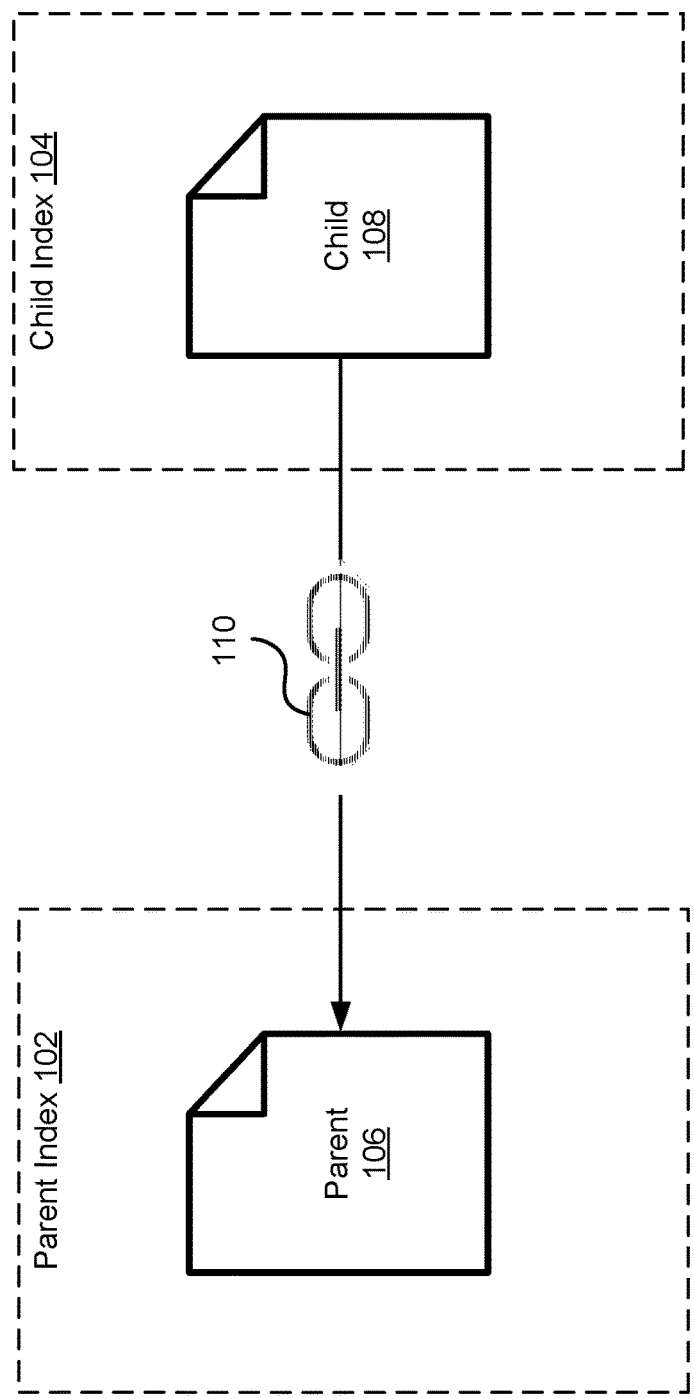
FIG. 1 illustrates an example relationship between a parent document accessible via a parent index and a child document indexed through a child index, according to at least one embodiment.

Systems and methods are described herein relating to indexing related documents in an index to enable robust search functionality within the index. In some aspects a parent document, such as a work order or ticket, may be related to one or more other documents, referred to herein as child documents. An example of a child document would be a comment or follow-up item relating to a ticket or work order. In many cases, these documents may be of a different type, such that they have different attributes, store different information, and are formatted in different ways. In many storage and indexing systems, such as Elasticsearch, these documents or other data structures may be stored and indexed separately for various reasons. In order to provide more robust search functionality for data including parent/child documents, the described systems and techniques may link parent and child documents in a parent document index using identifiers in the corresponding documents.

In some aspects, a representation of a parent document in a parent index may contain a list of all related child documents, and a representation of a child document in a child index may include a reference to the related parent document. In order to enhance searching these documents via indices, the parent document may be modified to include data stored in the one or more related child documents, when or before the parent document is indexed. This modified parent document that includes the related child document data may then be indexed in the parent index. When a query is run against the parent index, results will be provided that include a search of both the data in the parent document and the data included in the modified parent document from any or all related child documents. In this way, data, particularly data that includes documents that form a parent/child relationship, may be more robustly and efficiently searched using the described indices.

In some aspects, whenever the parent document is created or updated, the current contents of all related child documents may be obtained and added to the parent document. This modified parent document may then be indexed. In some cases, this process may apply for the purposes of indexing alone, whereas simply accessing a parent document may not trigger a re-indexing operation. Similarly, in some aspects, when a child document is added or updated, or deleted from a collection of documents, the child document may be indexed in a child index. The child document is associated with an identifier of the parent document in the child index. The addition or modification of a child document relating to a parent document may trigger a re-indexing process of the parent document. The child index may then be searched for any child documents that include an identifier of the parent document. The data, or a portion thereof, from the related child documents may then be obtained and added to an instance of the parent document. This modified instance of the parent document may then be indexed to update the parent index. In some cases, certain fields from the child documents may be configured, such as by a customer, to be indexed with the parent document in the parent index. In this way, relevant data may be included to optimize certain queries of the parent index without incurring undue overhead and by reducing the size of the associated indices.

The described techniques may address the problem of non-relational data stores and databased not supporting joins between different documents types and/or indices. In some cases, the described techniques may be particularly applicable and advantageous when applied to non-relational databases. However, it should be appreciated that in various circumstances, the described techniques may also advantageously be applied to other database systems and methodologies, including, in some aspects, relational databases.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: (1) providing more robust search functionality that results in less consumption of computing resources to deliver search results faster and more efficiently, and (2) other advantages as will be made apparent in the rest of this disclosure.

FIG. 1 illustrates an example relationship 100 between a parent document 106 accessible via a parent index 102 and a child document 108 indexed through a child index 104, such as may be stored in one or more non-relational data stores. Parent index 102 may be used to index a corpus of parent documents, including parent document 106, to provide for storage and search functionality with respect to the data contained in the parent documents. Parent index 102 may include any of a variety of mappings among data contained in various parent documents 106 and various data contained in any of a number of child documents 108 as well, as will be described in greater detail below. The parent index 102 may take a variety of forms or formats, as is known in the art. Parent documents, such as parent document 106, may include various pieces of information or data that have some type or relationship to one or more child documents, such as child document 108, represented by link 110. A primary example of a parent/child document relationship is a ticket or work order specifying some action to be performed, and comments, notes, or status updates pertaining to the ticket or work order. The described techniques may similarly be used with various other forms of data that form or can be logically organized into a parent child relationship.

In the example illustrated, child documents 108 may be indexed separately in a child index 104, which may organize a collection of child documents. Child document 108 may be modified to include a reference or pointer to a related parent document 106. Parent documents 108 may have a certain format or type, such as defined by any of a variety of constructs, including, for example a JavaScript Object Notation (JSON) schema, whereas the child documents 108 may be of a different type (e.g., include different data formatted in a different way) according to another JSON schema. Using the techniques described herein, a parent document 106 may be modified to include data from one or more related or linked child documents. The modified parent document 106 may then be indexed in the parent index 102, such that a query of the parent index 102 will return results from both the parent document 106 and any related child documents 108. In some cases, when a child document 108 is modified or added to the child index 104, the related parent document 106 may be re-indexed to include the modified child document data. That way, the parent index will index the most current version of the data and link it together for more efficient searching, such a s text searching for keywords or other information within the parent index.

As used herein, an index may refer to an organization or collection of data that can include any number of different types, with each type containing one or more documents. A document may refer to a row in a type, and may include any of a number of different properties or attributes. The described techniques will be described in reference to this non-relational database paradigm. However, it should be appreciated that the described techniques may be adapted to operate effectively with other non-relational database structures and conventions.

Figure 2:
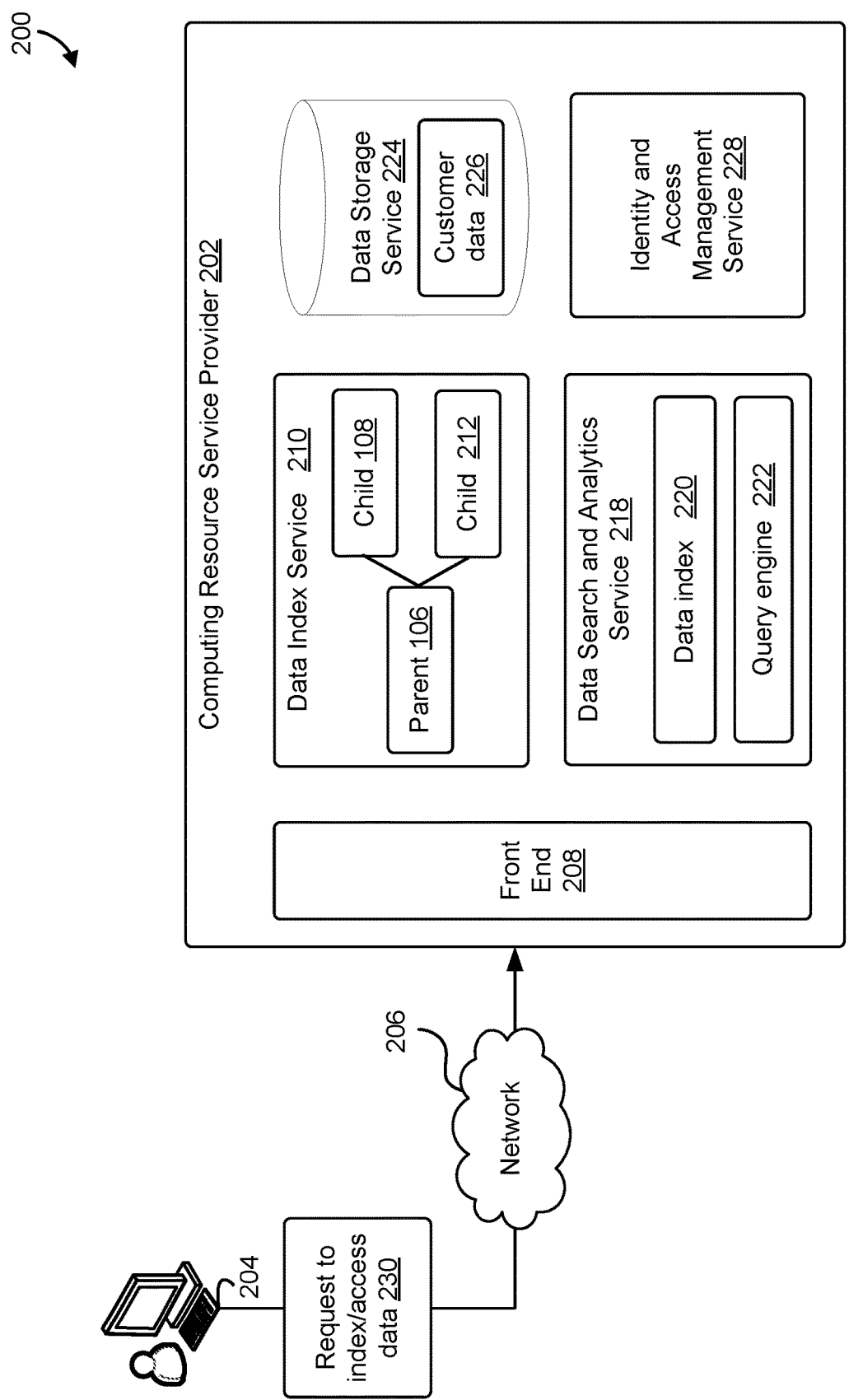
FIG. 2 illustrates an example environment in which the described techniques can be practiced, according to at least one embodiment.

FIG. 2 illustrates an example environment 200 in which a data index service 210 may be provided by a computing resource service provider 202. The data index service 210 may interact with a data search and analytics service 218 to provide data index, search, and analytic functionality, as will be described in greater detail below. Various client computing devices 204 may interact with the computing resource service provider 202 through one or more networks 206 to access the this functionality.

Client 204 may refer to a client computer system or computing device connected to a server (e.g., computing resource service provider) over a network 206. In some cases, client 204 refers to a user or operator of a client computer system, and may be an employee of an organization that utilizes a computing resource service provider 202 to interact with various forms of data, such as through one or more of a data index service 210, a data search and analytics service 218, and/or a data storage service 224.

Client 204 may submit a request 230 for access to various computing resources (e.g., services or computing resources thereof) of computing resource service provider 202. The request 230, in some examples, is a web service application programming interface request (also referred to simply as a web service request), may be received by a service of the computing resource service provider 202. As illustrated, the client 204 may submit a request 230 to configure, access, or interact with data indexed into a data search and analytics service 218. The request 230 may be directed to one or more services provided by the computing resource service provider 202, such as a data index service 210 and/or a data search and analytics service 218 via front end 208.

In some cases, the front end 208 may receive the request and direct it to the appropriate service. The front end 208 may be a system including a set of web servers (e.g., a single web server or a set of web servers which may be managed by a load balancer) provided by the computing resource service provider 202. Web servers of the front end 208 may be configured to receive various requests and to process them according to one or more policies associated with the service. In some examples, client 204 uses client software that is configured to establish a client-server relationship with a service of a computing resource service provider 202. A client 204 may connect to a service via front end 208, which receives requests from clients and routes them to backend services. Front end 208 may interface with one or more of a data index service 210, a data search and analytics service 218, and/or a data storage service 224, and/or other services offered by a computing resource service provider 202 to its customers. In at least one embodiment, client 204 interacts with a GUI to interact with various data provided by or through the computing resource service provider 202, and client-side software translates the GUI setup to a web service API request which is transmitted from the client computer system 204 to front end 208 via a network 206. In an embodiment, the network 206 includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network 206 is enabled by wired and/or wireless connections and combinations thereof. In some cases, a network may include or refer specifically to a telephone network such as a public switched telephone network or plain old telephone service (POTS).

The computing resource service provider 202 may provide various services such as data processing, data storage, software applications, security, encryption, and/or other such services. A computing resource service provider 202 described herein may be implemented using techniques described below in reference to FIG. 9. The computing resource service provider 202 may provide services that may be accessible through various software, hardware, and/or variations thereof. In some examples, the services may be implemented as software applications or services executing on various computing devices. Examples of such computing devices include one or more instances of a physical computing instance (e.g., a physical server computer, a mobile communication device, a laptop computer, a tablet computer, a personal computer, a mainframe, etc.) or one or more instances of a virtual computing instance, such as a virtual machine hosted on one or more computer servers, or other various capable computing systems.

In some examples, the computing resource service provider 202 may provide data storage through a data storage service 224 to store and manage large volumes of data, including text, image, and other data. The data storage service 224 may store various information pertaining to the data, such as one or more indices, as will be described in greater detail below that link various child documents to parent documents, and vice versa. In some aspects, the data storage service 224 may store customer data 226. Customer data 226 may include one or more versions of various customer data, such as may organized into parent documents, data objects, etc., and related child documents, data objects, etc., as may be indexed and accessed via data index service 210 and data search and analytics service 218. In some aspects, data storage service 224 may store indices 220 themselves, such as may be generated by the data index service 210 and managed by the data search and analytics service 218. In other cases, the indices 220 may be stored in other data storage locations, such as provided by other or external services, etc. In some aspects, data storage service 224 may maintain or store historical information, including past version information, of various data, including parent and child documents 106, 108, 212, and/or indices 220 to provide a complete history of customer data 226.

Data storage service 224 may be an on-demand data storage service, such as an object-based data storage service that services API requests to store and retrieve data objects synchronously, and may be configured to store various forms of media. The data storage service 224 may be implemented on a computer system, or abstraction thereof (such as one or more virtual machines, software containers, or other computing resource abstractions), implemented using hardware and software, and may comprise one or more processors and memory that stores executable instructions whose execution by the one or more processors causes the computer system to perform operations described herein. In some examples, data stored in the data storage service 224, may be organized into data objects, in one or more logical data containers. The data storage service 224 may include one or more data objects, which may have arbitrary sizes and may, in some instances, have constraints on size. Thus, the data storage service 224 may store numerous data objects of varying sizes. The data storage service 224 may operate as a key value store that associates data objects with identifiers of the data objects which may be used by the data index service 210 and/or data search and analytics service 218 to retrieve or perform other operations in connection with the data objects stored by the data storage service 224. Access to the object-based data storage service 224 may be through application programming interface (API) calls to the service or via an interface, such as a graphical user interface (GUI). Access to the data storage service 224 may be through application programming interface (API) calls to the service, for example from client device 204, directly or through the computing resource service provider 102 and/or front end 208.

It should be appreciated that the data storage service 224 may additionally or alternatively provide non-object based data storage, such as block data storage, table-oriented data storage, relational databases, file-based storage, and the like. The data storage service 224 may also implement an archival system or process that stores certain data objects in different storage locations, devices, etc., for example, based on access to those data objects or other factors. For example, some data objects that have not been accessed for a certain period of time may be moved from a storage device or location (e.g., referred to herein generally as storage class) that provides prompt access, albeit at increased cost, to a more cost effective storage class that may provide access with some delay, different redundancy, or other attributes.

The computing resource service provider 202 may also provide an identity and access management (IAM) service 228. The IAM service 228 may be a collection of computing resources, including physical resources, virtual resources, or combinations thereof, configured to control access to resources provided by the computing resource service provider 202. In some implementations, client device 204 may authenticate using credentials or an identity established with the computing resource service provider 202 by authentication performed through the IAM service 228, via techniques known in the art, to upload, access, and organize data managed by or through the data index service 210, the data search and analytics service 218, and or the data storage service 224. In some aspects, the IAM service may manage access to customer data 226, as may be stored by the data storage service 224, including implementing various security protocols to ensure that customer data 226 is secure.

The computing resource service provider 202 may also provide a data index service 210. The data index service 210 may be a collection of computing resources, including physical resources, virtual resources, or combinations thereof, configured to generate and update various indices, of customer data 226, such as may be managed and/or stored by data search and analytics service 218. In some aspects, the data index service 210 may generate and update indices 220 of parent documents 106 and documents related to those parent documents, child documents 108, 212. The indices, 220 may be stored and accessed by the data search and analytics service 218. In some cases, the data index service 210 may generate and update different indices 220 for different documents: such as one or more parent indices for parent documents 106 and one or more child indices for child documents 108, 212.

In some cases, the data index service 210 may configure the data included in and the mapping of certain data in one or more parent or child indices 220. In some cases, a customer, such as through a customer or client device 204, may configure various ways in which certain data of a group of documents or data objects is included and/or mapped in one or more indices. In yet some cases, a client 204 may configure what data fields or portions of data from different child documents are included in parent documents 106, such that the parent index will include the selected child data or a link or address of the selected child data. A client device 204 may configure these and other parameters for the indices via sending a request 230 to the data index service 210 or data search and analytics service 218.

The computing resource service provider 202 may also provide data search and analytics service 218. The data search and analytics service 218 may be a collection of computing resources, including physical resources, virtual resources, or combinations thereof, configured to organize, index, and query various customer data 226. The data search and analytics service 218 may store or manage one or more data indices 220, such as may be generated and/or updated by the data index service 210. The data search and analytics service 218 may also provide a query engine 222, which may be a process executed by the data search and analytics service 218 that can query the data indices 218, according to a client request 230. In some aspects, the data search and analytic service 218 may include a multi-tenant search engine. In some cases, the data search and analytic service 218 may search various data associated with different tenants or users concurrently.

Figure 3:
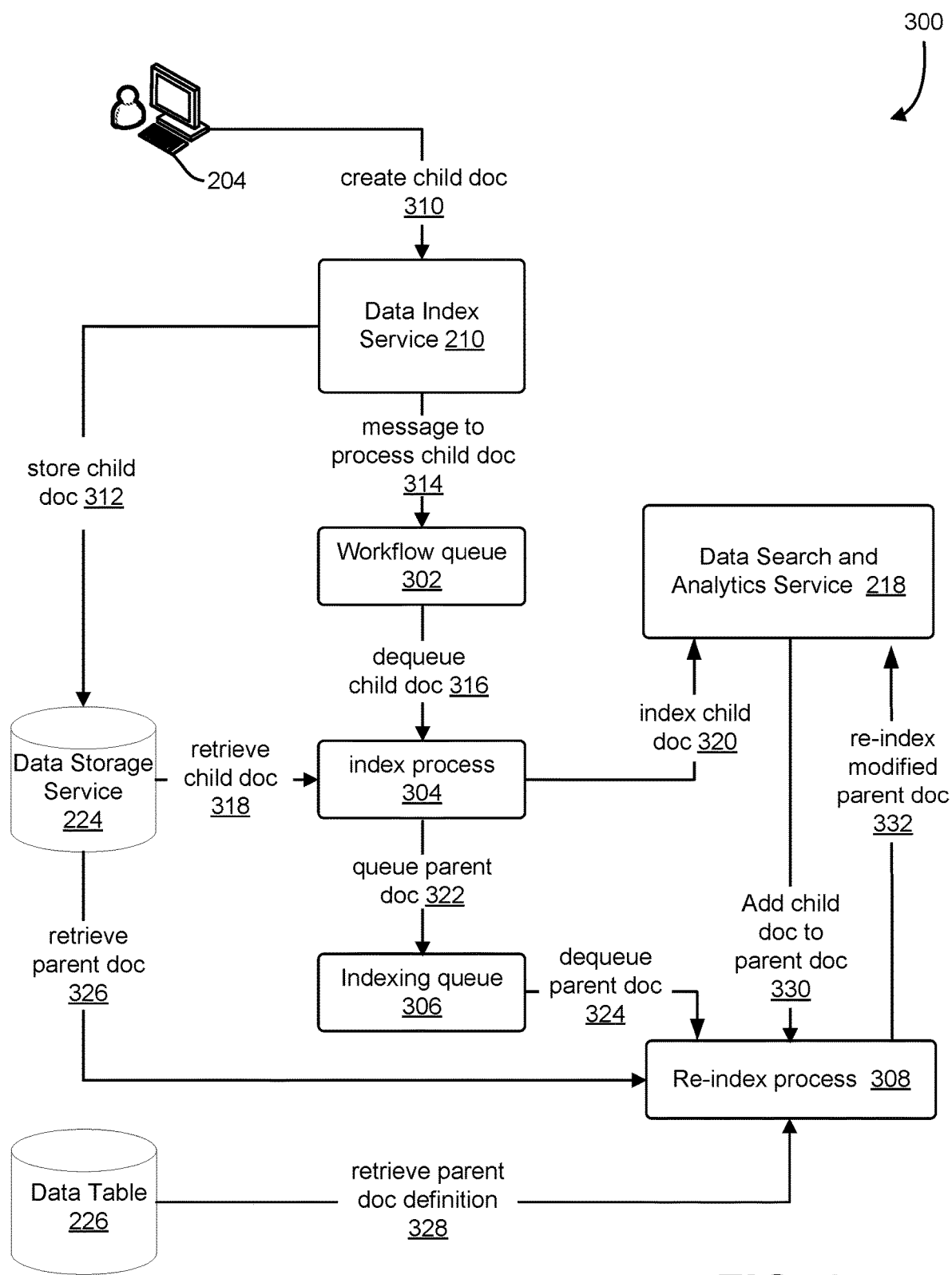
FIG. 3 illustrates an example process for updating a parent index to include a parent document linked to one or more child documents, according to at least one embodiment.

FIG. 3 illustrates an example process 300 for updating a parent index to include a parent document linked to one or more child documents. Process 300 may be performed by various services, such as the data index service 210, the data search and analytics service 218, and the data storage service 224 as described above in reference to FIG. 2.

Process 300 may begin at operation 310, in which a client device 204 may create, upload or modify a child document in a data store, such as customer data store 226 provided by data storage service 224. In some cases, the child document may be obtained or generated through one or more other services, such as provided by the computing resource service provider 202. The child document may indicate or have a reference to a parent document, such that already may be present and/or stored by the data storage service 224 as part of customer data 226. In one example, the child document may be a comment or status update, including text data, that is associated with a ticket item or work order or other data structure, such as may be generated and/or managed by a service. The child document may include any of a variety of data fields including various pieces of information, configured according to a document type schema. In some aspects, metadata may be included in or with the child document, and may include creation time/date, creator identifier, and/or various other attributes.

The data index service 210 may receive the child document and instruct the data storage service 224 to store an instance of the child document, at operation 312. In order to support a parent document being re-indexed upon a related child document being modified, a document identifier or parent document identifier may be added to a child document as it ingested by the data index service 210, such as at operation 310. In some cases, the identifier may include a set of identifiers, such as to support the case where a child document is related to more than one parent document.

The data index service 210 may enqueue a message to process the child document, at operation 314, such as in workflow queue 302. Workflow queue 302 may include temporary storage provided by the data index service 210. The data index service 210 may then dequeue the child document, at operation 316, whereby the data index service 210 may execute an index process 304 to process the child document by retrieving the child document from data storage service 224, at operation 318, and index the child document, at operation 320. Operation 320 may include adding the child document (and any metadata associated with the child document) to an existing index that is maintained by the data search and analytics service 218.

Next, the data index service 210 may enqueue a corresponding parent document to be re-indexed, such as identified by an identifier associated with the child document, at operation 322 into an indexing queue 306. In some aspects, operation 322 may be automatically triggered upon the data index service 210 receiving a new child document or receiving a change to an existing child document. Indexing queue 306 may include temporary storage provided by the data index service 210. In some aspects, the data index service 210 may implement a delay in re-indexing the parent document, to ensure that indexing the child document has completed, so that the re-indexed parent document will include data from the newly added child document. In one example, this delay may be configurable set time period (e.g., 1 second), or may be set based on one or more triggering events. The triggering event may include some indication that the child document has been indexed.

After the delay has elapsed and/or a triggering event has occurred, the data index service 210 may dequeue the parent document to be re-indexed, at operation 324. The data storage service 210 may execute a re-index process 308, which may retrieve the parent document from the data storage service 224, at operation 326. Next, the re-index process 308 may retrieve the parent document type definition, such as from one or more data tables or stores 226 associated with a client account, at operation 328. The parent document type definition may specify a child query and what field or fields of the child document that should be built into the parent document instance for re-indexing.

In some examples, one or more derived data fields may be defined and included into the parent document. A derived data field may be any data that is collected or obtained, such as from the parent or child document, and modified in some way, to provide modified data that itself is not contained in the parent or child document. In some cases, the derived data my include statistical information, such as a one or more numbers of parent documents relating to a certain issue or containing a key word, child documents, certain results or statuses pertaining to a parent document, or other information or indications of information, such as if certain words are contained in a related child document, time information pertaining to when documents were created or updated, or a variety of other information that may be derived or determined based on the underlying parent and/or child data. In some cases, the derived data may be determined at various points in the process, and added to the parent document prior to re-indexing the parent document.

An example of a parent document type definition is provided below, which specifies a number of fields from one or more child documents to be included in the modified instance of the parent document. This example includes an array of objects that contains the creation and last updated time of each comment with the actual comment text and author nested in an inner data object. It should be appreciated that this is only given by way of example, and that other data from one or more child documents may be included or excluded from a parent index.

```
{
 "type": "object",
 "additionalProperties":false,
 "properties": {
  "title": {
   "type": "string"
```

```
},
// OTHER PROPERTIES
"comments": {
 "type": "array",
 "items": {
  "type": "object",
  "additionalProperties": false,
  "properties": {
   "data": {
    "type": "object",
    "additionalProperties": false,
    "properties": {
     "text": {
      "type": "string"
     },
     "author": {
      "type": "string",
      "format": "keyword"
     }
    }
   }
  },
  "creationTime": {
   "type": "string",
   "format": "date-time"
  },
  "lastUpdatedTime": {
   "type": "string",
   "format": "date-time"
  }
 },
 "childDocumentData": {
  "maxResults": 1000, // optional
  "documentTypeName": "comment",
  "queryString": "data.ticketId:\"$
{parentDocumentId}\"",
  "includes": ["creationTime",
"lastUpdatedTime",
"data.text","data.author"],
  "excludes": [ ],
  "sorts":[
   {
    "fieldName": "creationTime",
    "sortOrder": "DESCENDING"
   }
  ]
 }
}
}
```

Next, the re-indexing process 308 may query for and obtain all child documents matching the child criteria using the child index managed by the data search and analytics service 218, and the specified data may be added to the parent document, at operation 330 such as according to the parent document type definition or schema. In some cases, operation 330 may including adding one, some or all of the child documents that reference the parent document to the parent document. Operation 330 may generate a modified parent document. This modified parent document may then be re-indexed, at operation 332, to update a parent index maintained by the data search and analytics service 218.

In some aspects, the parent document definition or schema may be configured, such as by a user or user device. In some implementations, the schema may include the document type or other identifiers of child documents to be searched, a query string, how the results are sorted, and what data fields to include/exclude. At runtime, a search for the specified child document type may be executed, and the raw results from the search can be inserted into the parent document. In some aspects, the process for determining what child data to include in the parent document may alternatively be accomplished by call a function, such as may be defined by a client or user, to search the child index and obtain the specified data for inclusion in the parent document.

In some examples, including the contents of the child documents into the parent document whenever the parent document is indexed may include first obtaining the selected data and then inserting it into the parent document data. One way to implement these two steps in updating the parent index may include allow an entity, such as a customer, to specify search criteria as part of the parent document type schema.

In some case, arrays of objects may be used to identify the child data to include in the parent document. Search criteria, such as may be used to identify child documents and information from child documents to include in a parent document, may be specified in a JSON structure as part of the parent document definition or schema. This may include all of the relevant attributes to execute a search such as the name of the document type to be searched, the actual query string to be executed, the attributes to be included/excluded as well as how the results should be sorted. To change search criteria, a new document type version may be created. In some aspects, parent document attributes can be included in the query by identifying all child documents where some ID refers back to the parent document ID. One or more replacement values may be supported, where users or customers can specify various attributes of the parent document. In some cases, one or more of the following replacement values can be used within the query string: the ID of the parent document, the name of the parent Document Type, the current version of the parent Document Type, the time at which the parent document was created, the time at which the parent document was last updated, the originating region of the parent document, the authenticated identify that created the parent document. In yet some cases, customers or users can control the maximum number of results to include by specifying a parameter as part of the search criteria to limit the results to a specified number.

Figure 4:
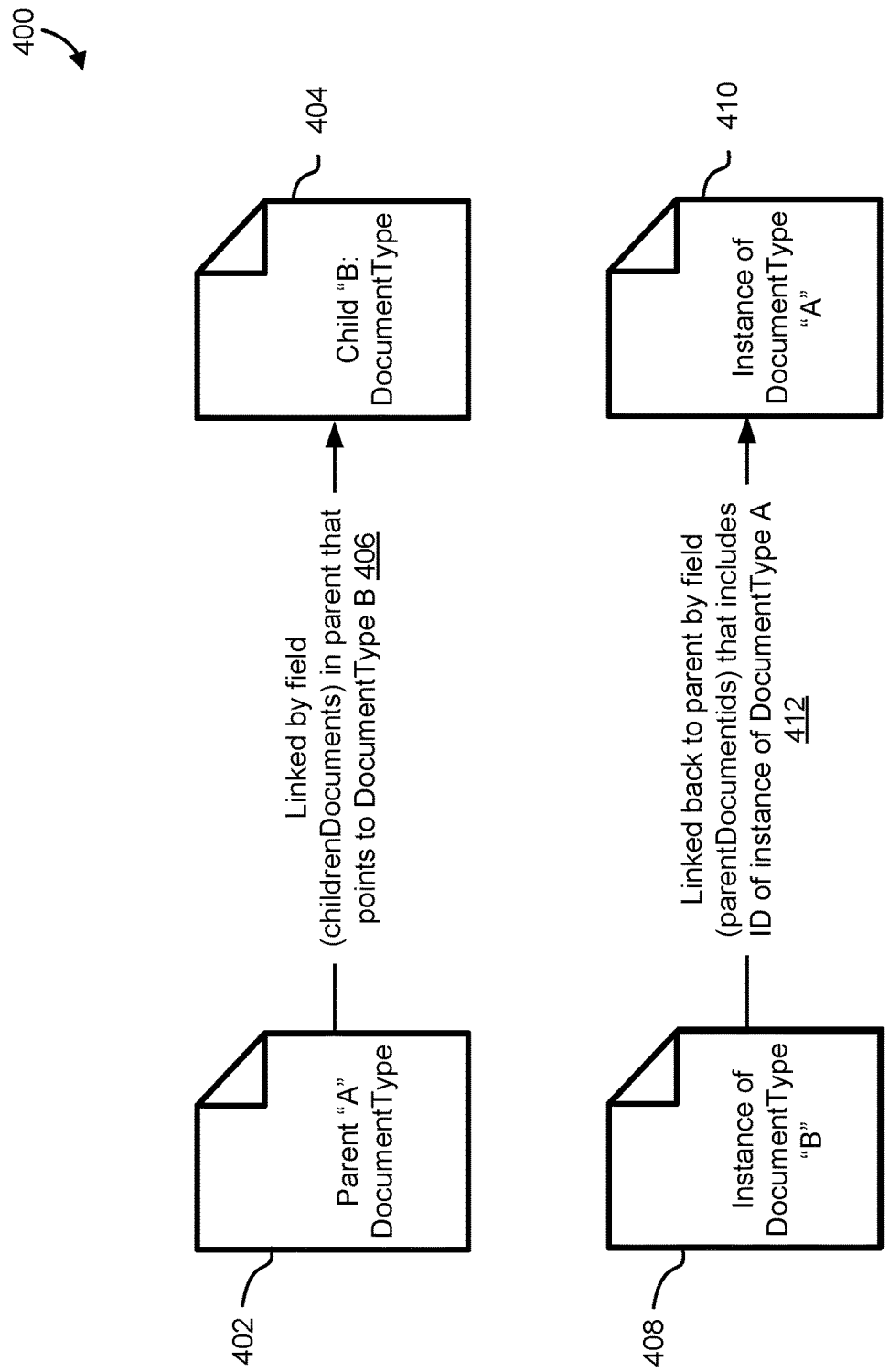
FIG. 4 illustrates another example relationship between a parent document and a child document which may be accessible through a parent index, according to at least one embodiment.

FIG. 4 illustrates another example relationship 400 between a parent document and a child document which may be accessible through a parent index. As illustrated, a parent "A" document type 402 may be linked by a field in the document type to one or more child "B" document type 404. Each of the parent and child document types 402, 404 may be an organization of data, such that the parent document type 402 stores data pertaining to a parent document or data, and a child document type 404 stores data pertaining to a parent document or data.

As illustrated, a parent document type 402 is defined by the addition of a children document member to the document type's data schema which points to a child document type 404, as indicated at 406. When the parent document type 404 is created, the child document type's entire schema is looked up and an array of it may be added to the parent's index mapping. As this implies, the child document type 404 would preexist the parent document type's 402 creation. When instances 408 of documents of the child document type 404 are created, a parent document identifier can be supplied which completes formation of a parent/child relationship or link 412 between an instance of a child document type B and an instance of a document type A.

Whenever the parent document is indexed, a query may be run in the child index for all documents of the child document type 404 that include the parent document identifier. Data retrieved from the child documents 408 may then be added into the instance of the parent document 410, which may then be indexed. Whenever a child document 408 is edited, this event may trigger a re-index of the associated parent document 410, if it has any. This guarantees that whenever either the parent or any child is updated, the parent will re-index both the latest version of the parent and the latest versions of all its children into the parent index.

Figure 5:
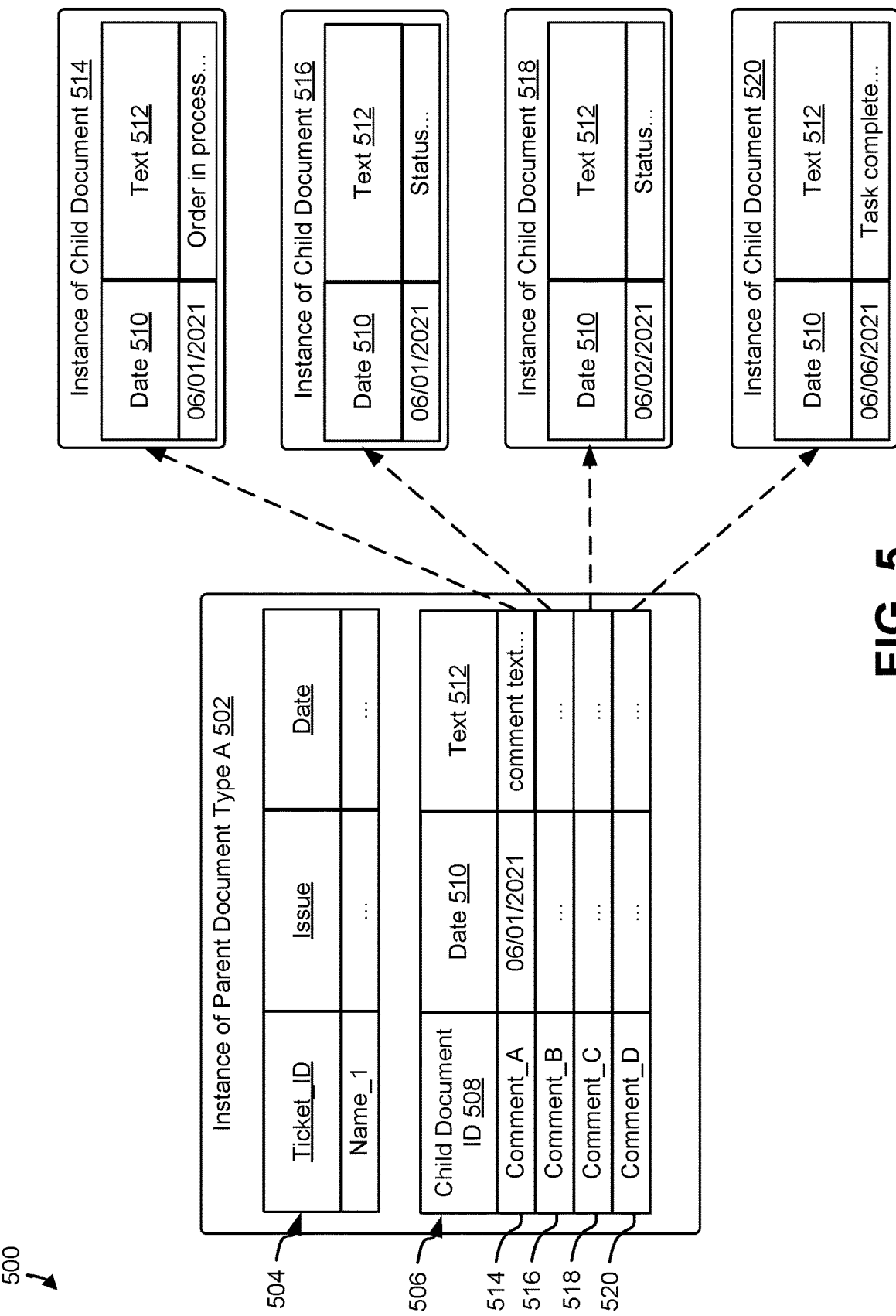
FIG. 5 illustrates an example diagram of a parent document linked to multiple child documents, according to at least one embodiment.

FIG. 5 illustrates an example diagram 500 of a parent document 502 that has been modified to include certain data from a number of linked child document instances 514, 516, 518, 520. A parent document may be modified to create modified instance of parent document 502, such as according to process 300 described above, which may then be indexed to provide more robust search functionality of both parent and child data in a single parent index.

In the example illustrated, the instance of a parent document 502 may include various information, indicated by items 504, such as a ticket identifier or other type of identifier, and data pertaining to the document, such as text identifying an issue or task to be completed, a date, and/or various other fields or attributes. The ticket identifier 504 may be added to each of the related child documents 514, 516, 518, 520, to complete the link between the parent document 502 and the child documents 514, 516, 518, 520. The parent document instance 502 may further include data, such as date 510 and text 512 from a number of related child documents 514, 516, 518, 520. As illustrated, child documents 514, 516, 518, and 520 may contain the same or different data, such as different textual comments 512 that were submitted or received on the same or different dates 510. In some cases, only select data from child documents 514, 516, 58, 520 may be appended to the instance of parent document 502, such as may be configured by a manager of the data and indices, and as described above in reference to FIG. 3.

Figure 6:
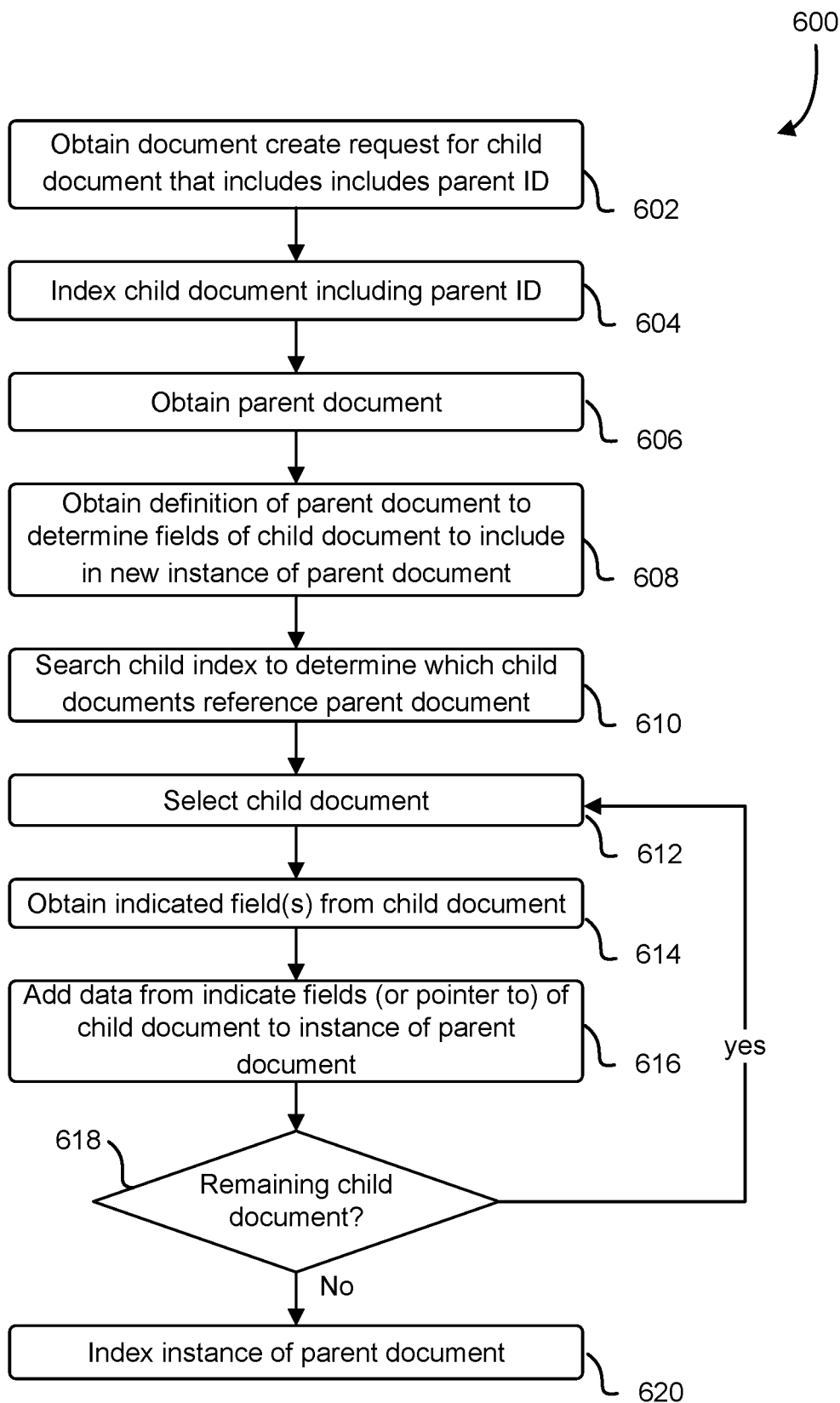
FIG. 6 illustrates an example process for linking a child document to a parent document in a parent index, according to at least one embodiment.

FIG. 6 illustrates an example process for 600 for linking a child document to a parent document in a parent index. In some aspects, process 600 may be performed by one or more of data index service 210 and/or a data search and analytics service 218 as described above in reference to FIG. 2.

Process 600 may begin at operation 602, in which a document create request may be obtained or received, such as by a data index service 210. The document create request may include a request to create a child document or other collection of data for purposes of indexing and storing the data. The request may include some type of indication of a related document, such as a parent document to which the child document pertains. The indication may include a parent document identifier, which may take any of a variety of forms. In other cases, the child document may be obtained, such as from one or more services, uploaded by a customer, etc., without an express request to create a record of the child document.

Upon obtaining the child document, the child document may be indexed into a child index, with the record of the child document including the parent document identifier, at operation 604, such as by data index service 210. The child index may be a collection of data including a number of rows each representing a different child document, and a number of columns repressing individual pieces of data for any given child document, such as described above in reference to FIG. 5. Indexing the child document may include adding a row to the child index and including the relevant data from the child document in the appropriate column, including the parent document identifier. The parent document, indicated by the parent document identifier associated with the child document, may then be obtained at operation 606, such as by the data index service and/or data search and analytics service 218, via a parent index.

At operation 608, a definition of the parent document may then be obtained, such as from customer data 226 or data managed by the data search and analytics service 218, to determine what data from the child document to include in the parent document. In some cases, the parent document definition may include one or more aspects of the example provided in reference to FIG. 3 above. In yet some examples, the definition may include at least one identifier corresponding to the at least one child document and at least one field of the child document to be stored with the parent document, wherein the at least a portion of the first data that is included with the parent document in the parent index comprises the at least one field of the child document.

The child index may then be queried to determine one or a set of child documents that are linked to the parent document, at operation 610, such as by the data index service 210, and/or the query engine 222 of the data search and analytics service 218. Upon identifying one or a set of related child documents, a child document may then be selected, at operation 612, the data, indicated via the parent document defection, may then be obtained from the selected child document, at operation 614, and added to the parent document at operation 616. In some cases, operation 616 may include modifying the parent document to include a portion of the first data of the at least one child document based on the identifier of the parent document in the child index. In some cases, only a portion of the child data may be added to an instances of the parent document. The data to include with the parent document may be optimized to data that is most frequently searched. In some cases, the data to include may be selected to reduce the size of the index created, while providing a desired level of inclusivity for data that is typically searched relating to the parent/child documents.

In yet some cases, operation 616 may alternatively include inserting a link or pointer to related child documents. When the parent index is subsequently searched, the query process may include identifying the related child documents from the links in the modified parent document, retrieving the indicated child documents, such as from a separate child index, and providing the selected data contained in the child document(s) with the parent data obtained from the modified parent document from the parent index.

Process 600 may continue to operation 618, in which it may be determined if there are remaining child documents to add to the parent document. As long as there are remaining child documents, process 600 may loop through operations 612, 614, 616, and 618. When no remaining linked child documents are available or found, at operation 618, process 600 may proceed to operation 620, where the modified parent document, that includes relevant or selected child data from linked child documents, may be indexed. In some cases, operation 620 may include updating the parent index that indexes a corpus of parent documents to associate the first data with the modified parent document, such that a query of the parent index based at least in part on the portion of the first data will result in returning the modified parent document or data contained therein. The resulting index may be saved and stored, such as by the data search and analytics service 218 and/or in customer data store 226. The resulting index may thus provide enhanced search functionality in including relevant child data linked to the related parent document in a single parent document index.

In some aspects, a process 600 may additionally or alternatively include one or more of the following operations. In one example, first data of a first document, such as a child document may be obtained and/or selected. As a result of the first data being linked to second data of a second document, such as a parent document, the child document may be processed by performing the following operations. First, the second document may be modified to include the first data from the first document. Second, a set of indices that indexes at least a corpus of documents may be updated, such as to cause the second document to be responsive to a query specifying the first data. In some cases, third data may be derived from the first data and/or the second data, and included into the parent or second document, such that the set of indices is updated to cause the third data to be responsive to a query specifying at least one of the first data or the second data. In some cases, a change to the first data or the second data may be identified. Responsive to the identification of the change, the set of indices may be updated such that responsive to a query for at least one of the first data or the second data, data containing the at least one change may be provided.

In either of the example processes described above, historical information relating to changes in one or more of the documents and/or indices may be saved in a separate location as documents or indices themselves. This may be to reduce resource consumption in readily accessible data stores, which may store the indices of documents themselves, and provide for quick access to this information to customers. This historical information may include past versions, changes, etc. made to the documents and/or indices, such as to enable recovering data and/or examining past changes to the data for various purposes.

Figure 7:
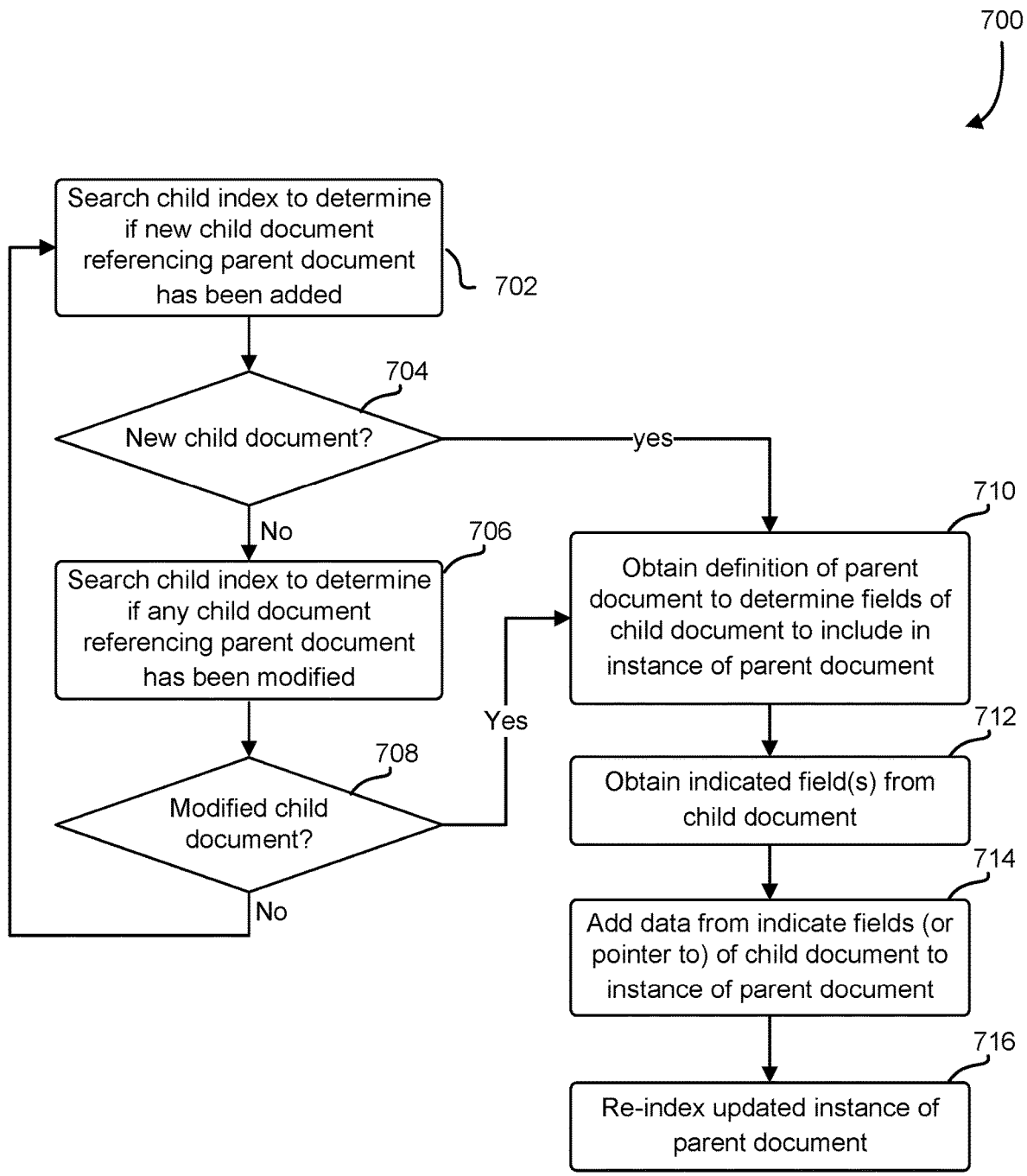
FIG. 7 illustrates an example process for updating a parent index that includes data from one or more child documents, according to at least one embodiment.

FIG. 7 illustrates an example process 700 for updating a parent index that includes data from one or more child documents. In some aspects, process 700 may be performed by one or more of data index service 210 and/or a data search and analytics service 218 as described above in reference to FIG. 2.

Process 700 may begin at operation 702, in which the child index may be searched to determine if a new child document has been added to the child index. In some cases, operation 702 may be performed upon the occurrence of a trigger event, such as a parent document being queued for indexing, a child document being modified or added to a data store, or other triggering events. In some cases, operation 702 may be unnecessary, such as when the system receives a request to add a new child document or modify an existing one. In these scenarios, as described above in reference to FIG. 6, the system may automatically detect such an occurrence and may not have to actively search the child index to determine which child document has been added or modified. It should be appreciated, that in some cases, both an automatic detection scheme, and a search scheme may be advantageously employed together. Next, at operation 704, it may be determined if a new child document has been identified. If a new child document has been identified, at operation 704, a parent document definition or schema may be obtained, to determine what child data to include with the related parent document, at operation 706. In some cases, the parent document definition may be determined based on a corresponding parent document identifier included with or associated with the child document.

The indicated fields or portions of data within the child document may then be obtained, at operation 712, such as from a child index maintained by the data search and analytics service 218, and added to a version, copy, or instance of the parent document, at operation 714. The modified parent document instances may then be re-indexed, at operation 716. If, at operation 704, no new child documents are identified, process 700 may continue to operation 706, in which the child index may be searched to determine if any child document referencing the associated parent document has been modified. 706. If no modified document is identified, process 700 may loop back to operation 702 to be performed again, such as periodically or upon the occurrence of a triggering event. If, however, a modified document is identified, at operation 708, process 700 may proceed to operations 710, 712, 714, and 716 as described above.

In some examples, operation 702 may include identifying a second child document that includes the identifier of the parent document. In this example, operation 714 may include modifying the parent document to include at least part of first data of a first child document and at least part of the third data of the second child document.

In some cases, each child document and/or parent document may include a field that indicates the last time/date that the document was updated or changed. The search for determining if there are any new or modified documents may include a search of this last modified information associated with each document, to facilitate identifying documents that have been added or modified since the last time the parent document was indexed or updated.

Figure 8:
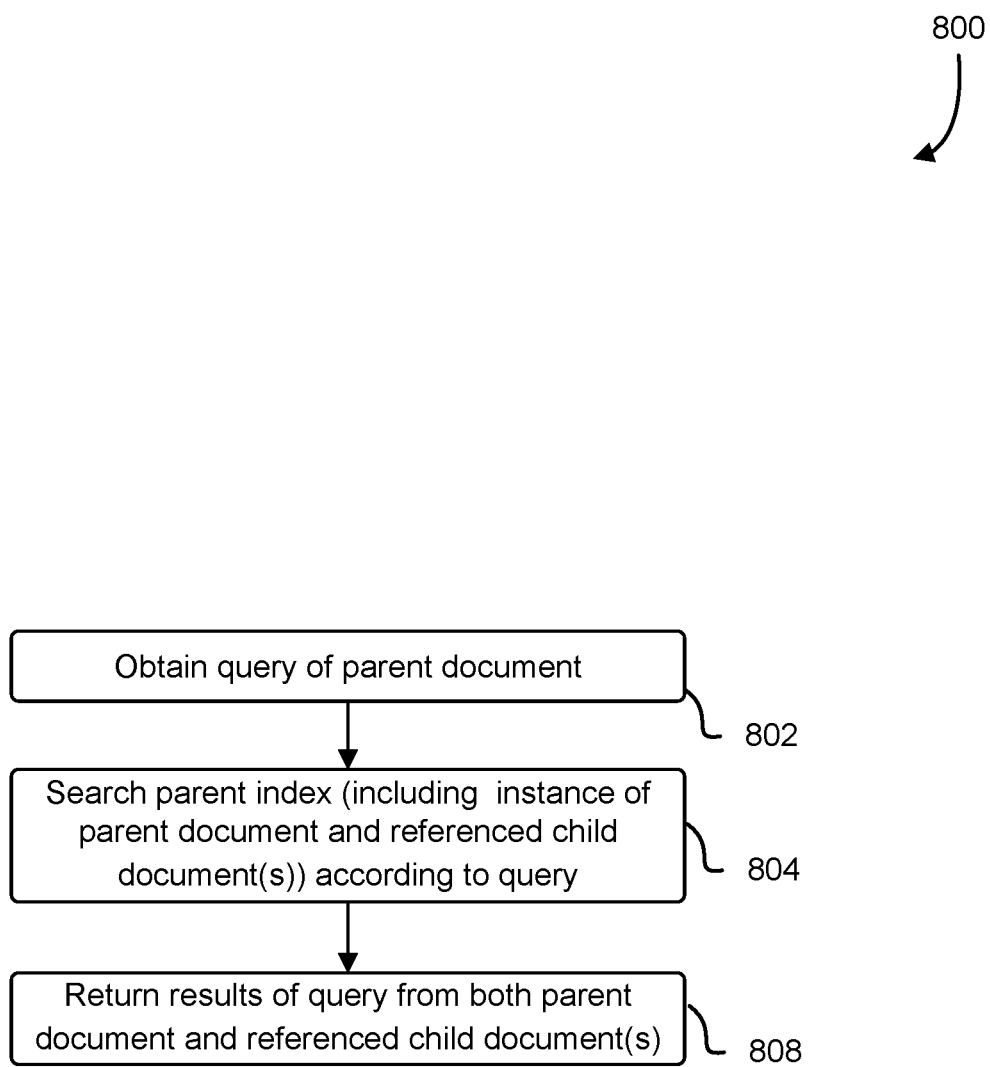
FIG. 8 illustrates an example process for processing a query of a parent index that includes data from one or more child documents, according to at least one embodiment.

FIG. 8 illustrates an example process 800 for processing a query of a parent index that includes data from one or more child documents. In some aspects, process 700 may be performed by one or more of data index service 210 and/or a query engine 22 provided by a data search and analytics service 218, as described above in reference to FIG. 2.

Process 800 may begin at operation 802, in which a query to search a parent document or parent document index may be received or obtained, such as by data search and analytic service 218. The query may contain any information pertaining to one or more parent or child documents contained in an index, such as a parent indexes as described above. The query may include a text based query, such as including one or more keywords in a ticket item or comment, that may be of particular interest to a user or customer. The query may be directed at identifying status of a task to be performed as indicated in a work order, such as pending or completed, comments related to an interaction between entities, such as a customer and agent, or various other data that may be contained in data that forms some type of parent child relationship.

In response to the query, the parent index, such as created and/or updated via processes 600 and/or 700 described above in reference to FIGS. 6 and 7, may then be searched for the data identified in the query. Results from the query, which may be taken from parent documents and child document data included with modified parent documents in the parent index, may then be returned, at operation 808. In some cases, operation 808 may include returning data that satisfies the query from the at least a part of first data of the child document and the second data of the parent document according to the parent document index.

Figure 9:
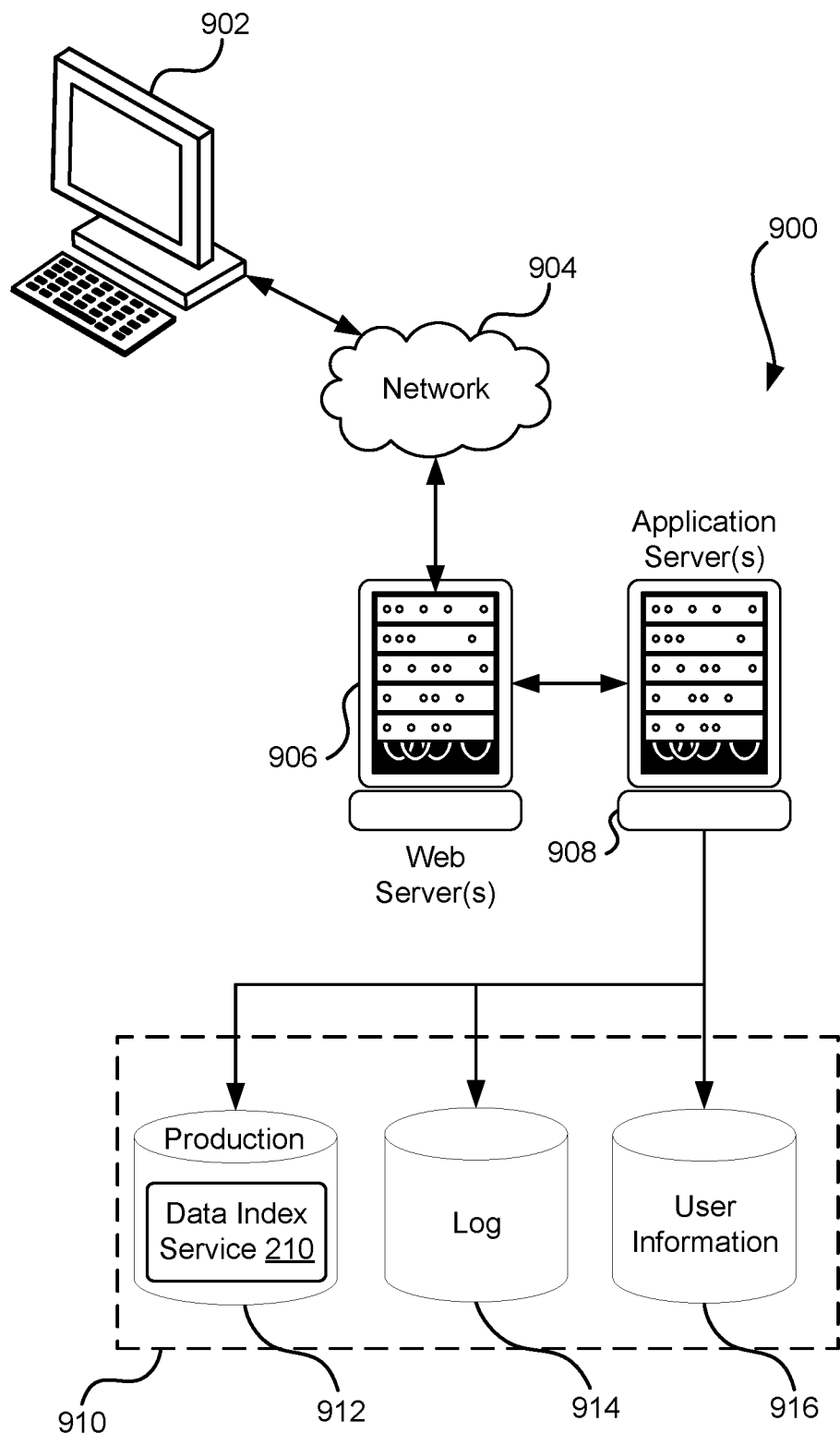
FIG. 9 illustrates a system in which various embodiments can be implemented.

FIG. 9 illustrates aspects of an example system 900 for implementing aspects in accordance with an embodiment. As will be appreciated, although a web-based system is used for purposes of explanation, different systems may be used, as appropriate, to implement various embodiments. In an embodiment, the system includes an electronic client device 902, which includes any appropriate device operable to send and/or receive requests, messages, or information over an appropriate network 904 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 906 for receiving requests and serving content in response thereto, although for other networks an alternative device serving a similar purpose could be used as would be apparent to one of ordinary skill in the art.

In an embodiment, the illustrative system includes at least one application server 908 and a data store 910, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 902 and the application server 908, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 910, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 912 and user information 916, which are used to serve content for the production side. In some aspects, the production data 912 may include or provide the data index service 210, as described above in reference to FIG. 2. The data store also is shown to include a mechanism for storing log data 914, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 910.

The data store 910, in an embodiment, is operable, through logic associated therewith, to receive instructions from the application server 908 and obtain, update or otherwise process data in response thereto, and the application server 908 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 902. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 900 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 900, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
   obtaining at least one child document, the at least one child document comprising first data linked to second data in a parent document;
   indexing the at least one child document to update a child index that indexes a corpus of child documents, the child index associating the child document with an identifier of the parent document; and
   as a result of the child document comprising the first data:
      modifying the parent document to include a portion of the first data of the at least one child document based on the identifier of the parent document in the child index, the portion of the first data of the at least one child document comprising at least one child document identifier and at least one field of the at least one child document; and
      updating a parent index that indexes a corpus of parent documents to associate the first data with the modified parent document, such that a query of the parent index based at least in part on the portion of the first data will result in the modified parent document.

2. The computer-implemented method of claim 1, wherein updating the parent index further comprises:
   obtaining a definition of the parent document, the definition comprising at least one identifier corresponding to the at least one child document and at least one field of the child document to be stored with the parent document, wherein the at least a portion of the first data that is included with the parent document in the parent index comprises the at least one field of the child document.

3. The computer-implemented method of claim 1, further comprising:
   obtaining a query of the parent document index; and
   responsive to the query, searching the parent index and returning data that satisfies the query from the at least a part of the first data and the second data according to the parent document index.

4. The computer-implemented method of claim 1, further comprising:
   responsive to identifying a second child document that includes the identifier of the parent document, updating the parent index by:
      modifying the parent document to comprise at least part of the first data of the at least one child document and at least part of the third data of the second child document.

5. A system, comprising:
   at least one processor; and
   memory that stores computer-executable instructions that, as a result of being executed by the one or more processors, cause the system to:
      obtain a first document; and
      as a result of the first document comprising first data that is linked to second data of a second document:
         modifying the second document to include at least a portion of the first data or a reference to at least the portion of the first data and an identifier of the first document; and
         updating an index to include the modified second document, the index indexing a corpus of documents such that the first data is associated with the modified second document in the index.

6. The system of claim 5, wherein the computer-executable instructions further comprise instructions that, as a result of being executed by the one or more processors, further cause the system to:
   obtain, from a client device, an indication specifying the at least a portion of the first data to associate with the second document; and
   select the at least a part of the first data to include in the second document based on the indication.

7. The system of claim 5, wherein the computer-executable instructions further comprise instructions that, as a result of being executed by the one or more processors, further cause the system to:
   updating a second index that indexes a plurality of first documents to associate an identifier of the second document with the first document; and
   updating the index upon completion of updating the second index.

8. The system of claim 5, wherein the computer-executable instructions further comprise instructions that, as a result of being executed by the one or more processors, further cause the system to:
   obtain a query of the index; and
   responsive to the query, return data that satisfies the query from the at least a portion of the first data and at least part of the second data according to the index.

9. The system of claim 5, wherein the computer-executable instructions, further include instructions that cause the system to:
   responsive to at least one of detecting a trigger event or upon detection of the first document being added to a data store managed by the system:
      modifying the second document to comprise at least the portion of the first data or the reference to at least the portion of the first data; and
      updating the index to include the modified second document.

10. The system of claim 5, wherein the computer-executable instructions further comprise instructions that, as a result of being executed by the one or more processors, further cause the system to:
  responsive to identifying a third document that comprises third data and an identifier of the second document:
    modifying the second document to comprise at least a portion of the third data or a reference to at least the portion of the third data; and
    updating the index to include the modified second document.

11. The system of claim 5, wherein the first document comprises a first document type comprising a first set of attributes, and wherein the second document comprises a second document type, different from the first document type, and comprising a second set of attributes.

12. The system of claim 5, wherein the computer-executable instructions further comprise instructions that, as a result of being executed by the one or more processors, further cause the system to:
  derive third data from the at least the portion of the first data and the second data; and
  modify the second document to include the third data, such that a query of the third data will result in the second document.

13. A non-transitory computer-readable storage medium storing thereon executable instructions that, as a result of being executed by one or more processors of a computer system, cause the computer system to at least:
  select first data of a first document; and
  as a result of the first data being linked to second data of a second document, process the first document by at least:
    modifying the second document to comprise the first data of the first document and an identifier of the first document; and
    updating a set of indices that indexes at least a corpus of documents to cause the second document to be responsive to a query specifying the first data.

14. The non-transitory computer-readable storage medium of claim 13, wherein the instructions further comprise instructions that, as a result of being executed by the one or more processors, cause the computer system to:
  derive third data from the first data and the second data;
  modify the second document to comprise the third data; and
  update the set of indices to cause the third data to be responsive to a query specifying at least one of the first data or the second data.

15. The non-transitory computer-readable storage medium of claim 13, wherein the instructions further comprise instructions that, as a result of being executed by the one or more processors, cause the computer system to:
  identify at least one change to at least one of the first data or the second data; and
  responsive to identifying the at least one change, update the set of indices such that responsive to a query for at least one of the first data or the second data, providing the at least one change.

16. The non-transitory computer-readable storage medium of claim 15, wherein the set of indices is stored in a first location, and wherein the instructions further comprise instructions that, as a result of being executed by the one or more processors, cause the computer system to:
  store historical information relating to changes to the set of indices in a second location.

17. The non-transitory computer-readable storage medium of claim 13, wherein the instructions further comprise instructions that, as a result of being executed by the one or more processors, cause the computer system to:
  index the at least one first document to update a child index that indexes a plurality of first documents of the set of indices, the child index associating the first document with an identifier of the second document.

18. The non-transitory computer-readable storage medium of claim 13, wherein the instructions further comprise instructions that, as a result of being executed by the one or more processors, cause the computer system to:
  obtain a query of the index; and
  responsive to the query, return data that satisfies the query from the at least part of the first data and at least part of the second data according to the index.

19. The non-transitory computer-readable storage medium of claim 13, wherein the second document comprises a ticket item, and wherein the first document comprises at least one comment relating to the ticket item.

20. The non-transitory computer-readable storage medium of claim 13, wherein the instructions further comprise instructions that, as a result of being executed by the one or more processors, cause the computer system to:
  obtain, from a client device, an indication specifying the first data to be included with the second document; and
  select first data to add to the second document based on the indication.

\* \* \* \* \*